United States Patent Office 3,222,324
Patented Dec. 7, 1965

3,222,324
POLYMERS OF 3-ALKENYLOXY-1,2-
EPITHIOPROPANE
Nicolas Brodoway, Claymont, Del., assignor to E. I. du Pont de Nemours and Company, Wilmington, Del., a corporation of Delaware
No Drawing. Filed Jan. 29, 1962, Ser. No. 170,533
2 Claims. (Cl. 260—79.7)

This invention is directed to 3-alkenyloxy-1,2-epithiopropanes and to polymeric thioethers derived therefrom.

While a great many useful polymeric materials are known, the search continues for new polymeric materials to meet the widely diverse needs of an advancing technology.

It is, therefore, an object of this invention to provide a class of new compounds. It is a further object to provide polymers prepared from said compounds, which polymers are elastomeric materials having significant and useful properties. These and other objects will become apparent in the following description and claims.

More specifically, the present invention is directed to compounds of the formula

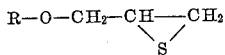

wherein R is seleced from the group consisting of cyclic and acyclic hydrocarbon radicals containing 3 to 8 carbon atoms, said radicals having one aliphatic >C=C< group in the radical.

This invention is also directed to polymers consisting of a multiplicity of units of the structure

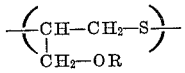

in which structure R is a radical as heretofore described.

In the novel compounds of the present invention, the R group may be an acyclic hydrocarbon group or may contain a cycloaliphatic ring.

Examples of compounds are: 3-allyloxy-1,2-epithiopropane, 3-(2-butenyloxy) - 1,2-epithiopropane, 3-(1-methylallyloxy) - 1,2 - epithiopropane, 3-(2-methylallyloxy)-1,2-epithiopropane, 3-(2 - pentenyloxy) - 1,2 - epithiopropane, 3-(1-methyl-2-butenyloxy)-1,2-epithiopropane, 3-(3-ethyl-4-hexenyloxy) - 1,2 - epithiopropane, 3-(2 - cyclohexen-1-yloxy)-1-2-epithiopropane, 3-(2-cyclohexen-1-yloxy)-1,2-epithiopropane, 3-(2-cyclopenten-1-yloxy)-1,2-epithiopropane, and 3-(3-methyl-4-hexenyloxy)-1,2-epithiopropane.

The preferred compounds are those in which the R groups contain 3 to 6 carbon atoms.

These compounds may be prepared from the corresponding compound R—O—CH$_2$—CH=CH$_2$ by the monoepoxidation of the compound as described in J. Chem. Soc., 1950, 3131–5 and Chemical Reviews 45, 16 (1949), and converting the epoxy compound so prepared to the corresponding epithio compound. This may be accomplished by reacting the epoxy compound with thiourea as described in J. Am. Chem. Soc., 75, 4959 (1953).

The reaction is carried out in a solvent such as water or ethanol which is capable of dissolving the thiourea and the epoxy compound to at least a slight extent. Temperatures should be kept below about 30° C. to avoid polymerization of the epithio compound as it is formed. The temperature, of course, should be above the freezing point of the reaction medium. Preferred temperatures are between about 10° and 20° C. in order to have the reaction proceed at a satisfactory rate. Ordinary atmospheric pressures are used, although higher or lower pressures may be used if desired. The product is isolated by conventional techniques. For example, the reaction mass may be diluted with water and the organic phase is then separated. The product is then washed, dried, and may be further purified by fractionation. Fractionation should be carried out at reduced pressures to avoid polymerization of the product. Pressures of 2 to 20 mm. Hg are usually satisfactory.

Polymerization of these compounds is carried out in an anhydrous inert organic solvent in the presence of a catalyst of the anionic type. Suitable catalysts include alkali metals; strongly basic salts of alkali metals such as hydroxides, sulfides, hydrosulfides, mercaptides, alkoxides, and amides; metal alkyls, particularly of divalent and trivalent metals; and mercaptides of divalent and trivalent metals. Examples of suitable catalysts are sodium, lithium, sodium hydroxide, sodium sulfide, triisobutylaluminum, diethylzinc, phenylmagnesium bromide, diethylmagnesium, and sodium, zinc, or aluminum salts of dodecyl mercaptan. Suitable solvents are aromatic hydrocarbons—such as benzene, toluene, and xylene—tetrachloroethylene, and thiophene; these solvents should be anhydrous.

The polymerization is carried out at a temperature ranging from about 0 to 75° C. At temperatures below 0° C. the polymerization proceeds too slowly to be practical. Since the molecular weight of the polymer is adversely affected by elevated temperatures, it is preferred to carry out the polymerization at as low a temperature as is feasible. The preferred temperature range is about 25° to 60° C.

It is generally more convenient to carry out the polymerization at atmospheric pressure, although higher or lower pressures may be used. The reaction should be carried out in an inert atmosphere, such as in an atmosphere of nitrogen.

The polymers are isolated by conventional methods. For example, the polymerization mass may be dissolved in an organic solvent, such as toluene, benzene, xylene, tetrachloroethylene, tetrahydrofuran, or chloroform, and the polymer is precipitated by adding an alcohol, such as ethanol or isopropyl alcohol. The solvents are then removed in vacuo.

The polymers produced according to the present invention are elastomeric in character. Because of the pendant groups containing a double bond they may be cured readily with sulfur and typical vulcanization accelerators using conventional techniques applicable to other unsaturated elastomers.

These polymers also have significant utility for such applications as in caulking compounds and as binders in paint formulations.

The heretofore described monomeric compounds of this invention may also be copolymerized with other epithio compounds, such as propylene sulfide, to produce thioethers containing pendant unsaturated groups in varying proportions.

Representative examples illustrating the present invention follow.

*Example 1*

A slurry is prepared consisting of 76 grams (one mole) of thiourea in 300 ml. of water. The slurry is agitated and held at 10–20° C. while 114 g. (one mole) of 3-allyloxy-1,2-epoxypropane is added dropwise. The mixture is stirred for twenty hours at 5–20° C. The heavy oil formed is separated, dried over calcium chloride, and distilled through a spinning-band column giving a 50 percent yield of 3-allyloxy-1,2-epithiopropane boiling at 56–57° C. at 6.5 mm. Hg. The product has an index of refraction $n_D^{20}$ 1.4936, and a density $d_4^{25}$ of 1.0137.

*Example 2*

To a dry flask under a nitrogen atmosphere are added 6.5 grams (0.05 mole) of 3-allyloxy-1,2-epithiopropane and 0.1 ml. of a solution of diethylzinc in heptane (25 percent by weight). The solution is stirred at room temperature for eight hours and is allowed to stand for four days. The product, which is a viscous semi-solid, is dissolved in toluene, and the polymer is precipitated with ethanol (Formula 2B as described in the 1961 Lange Handbook of Chemistry, Tenth Edition, page 1781). The rubbery polymer weighs 3.45 grams (53 percent conversion of monomer). The infrared spectrum is consistent with the structure

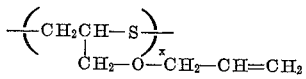

The preceding representative examples may be varied within the scope of the present total specification disclosure, as understood and practiced, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A sulfur-curable, elastomeric polymer consisting of a multiplicity of units of the structure

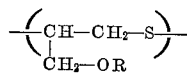

in which structure R is selected from the group consisting of cyclic and acyclic hydrocarbon radicals containing from 3 to 8 carbon atoms, said radicals having one aliphatic $$>C=C<$$

group in the radical.

2. A polymer according to claim 1 wherein R is an allyl radical.

References Cited by the Examiner
UNITED STATES PATENTS

| | | | |
|---|---|---|---|
| 2,183,860 | 12/1939 | Coltof | 260—79 |
| 2,724,719 | 11/1955 | Markley et al. | 260—327 XR |
| 2,891,072 | 6/1959 | Remes et al. | 260—327 |

OTHER REFERENCES

Schuetz et al., "The Preparation and Desulfurization of Some Unsymmetrically Substituted Thiiranes," Journal of Organic Chemistry, vol. 26, September 1961.

Jacobs et al., "Reaction of 2-Alkoxymethylthiiranes With Lithium Aluminum Hydride and With Secondary Amines," Journal of Organic Chemistry, vol. 26, September 1961.

JOSEPH L. SCHOFER, *Primary Examiner.*

J. R. LIBERMAN, *Examiner.*